Patented Nov. 6, 1951

2,574,235

UNITED STATES PATENT OFFICE 2,574,235

METHOD FOR THE PREPARATION OF 1-ACETOXY-1,1-DICYANO ETHANE

Alan E. Ardis, Cuyahoga Falls, Ohio, assignor to The B. F. Goodrich Company, New York, N. Y., a corporation of New York No Drawing. Application January 10, 1950, Serial No. 137,882

5 Claims. (Cl. 260—465.4)

This invention relates to a method for the preparation of 1-acetoxy-1,1-dicyano ethane, and pertains more particularly to its preparation by the vapor phase, catalytic reaction of ketene and hydrogen cyanide.

In U. S. Patent 2,476,270 it is disclosed that 1-acetoxy-1,1-dicyano ethane (also known as diacetyl cyanide) is an extremely valuable compound in that it readily undergoes pyrolysis when heated to temperatures of about 450° C. to 850° C. to give monomeric vinylidene cyanide, certain polymers of which form excellent synthetic filaments, films, and the like.

Heretofore, 1-acetoxy-1,1-dicyano ethane has been prepared by the reaction of acetic anhydride with sodium or potassium cyanide, by the dimerization of acetyl cyanide in presence of a base and, together with alpha-cyanovinyl acetate, by the liquid phase reaction of ketene and hydrogen cyanide in the presence of a tertiary amine. The vapor phase reaction of ketene and hydrogen cyanide over surface-active materials such as pumice and activated charcoal has also been reported, but as resulting only in the production of monomolecular acetyl cyanide.

I have now discovered that when vapors of ketene and hydrogen cyanide are passed over a catalyst bed composed of an unactivated carbon, at a temperature of from about 200° C. to 550° C. chemical reaction occurs between the ketene and the hydrogen cyanide to form 1-acetoxy-1,1-dicyano ethane in excellent yields. The reaction of ketene with hydrogen cyanide according to this invention is believed to proceed substantially according to the following equation:

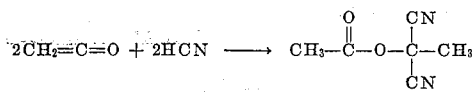

As will be seen from the above reaction equation, two moles of ketene are stoichiometrically required to react with two moles of hydrogen cyanide to form 1-acetoxy-1,1-dicyano ethane. However, the two reactants may be brought together in any desired ratio; in fact, it has been discovered that highest yields of 1-acetoxy-1,1-dicyano ethane are obtained when a slight excess of ketene, for example, about 1.2 to 2.0 moles of ketene for each mole of hydrogen cyanide, is present.

The temperature and pressure at which the reaction is conducted may be varied considerably. In general, it may be stated that temperatures in the range of from 200° C. to 550° C. are operative, with a particularly preferred range being from 300° C. to 400° C. The reaction is ordinarily carried out at substantially atmospheric pressure, although higher pressures and subatmospheric pressures are also operative. Dilution of the reactants with an inert gas such as nitrogen, helium, or the like, permits the obtainment of subatmospheric partial pressures, and also facilitates mixing of the reactants and passage of the reactants over the catalyst bed.

The catalyst over which the ketene and hydrogen cyanide are passed in the preparation of 1-acetoxy-1,1-dicyano ethane may be any of the various forms of unactivated carbon. For example, there may be used an animal or vegetable charcoal, such as bone charcoal, hardwood or softwood charcoals, coke, coal, graphite or the like. The charcoal known as "chicken charcoal," which is formed from various hard and soft woods is the preferred catalyst for use in the reaction, not only because high yields of desired product are secured, but also because such charcoals are very economically obtained. The catalyst is preferably utilized in the 6 to 14 mesh particle size in order that most efficient contact of the reactant gases with the catalyst surface may be achieved.

No special reaction procedures are necessary in carrying out the reaction of the present invention. Thus, reaction is effected simply by passing vapors of ketene and hydrogen cyanide, with or without a diluent gas, over the heated catalyst bed. However, useful expedients, which result in higher yields and conversions, but which are not critical expedients in themselves, include the use of a preheater to mix together the ketene and the hydrogen cyanide and to preheat them to a temperature of about 200° C. before they are passed over the catalyst, and the use of glass, ceramic or other packing material on the entrance side of the catalyst bed in order further to mix and preheat the reactants. It is also desirable that the hydrogen cyanide be substantially anhydrous, since any water present may tend to react with the ketene and reduce the yield of the desired product.

The contact time, that is, the time during which the reactant gases remain in contact with the catalyst, may be varied widely without substantially affecting the yield of 1-acetoxy-1,1-dicyano ethane. For example, contact times as low as 0.05 second to 1.0 or more seconds give excellent results.

The effluent gases which pass from the catalyst chamber include the desired 1-acetoxy-1,1-dicyano ethane together with some unconverted reactants and by-products. The gases may be used in other processes, as such, or if desired, they may be condensed and the 1-acetoxy-1,1-dicyano ethane recovered from the resulting condensate by distillation, preferably at reduced pressures, or by other common means of separation.

The following examples are intended to illustrate more completely the preparation of 1-acetoxy-1,1-dicyano ethane according to the method of this invention, but are not to be construed as a limitation upon the scope thereof, for there are, of course, numerous possible variations and modifications. In the examples, all parts are by weight.

*Examples I to VI*

In the following examples 1-acetoxy-1,1-dicyano ethane is prepared by passing ketene and hydrogen cyanide over various samples of unactivated charcoals. The charcoal (8 to 14 mesh) is placed in a vertical tube which also contains glass beads to aid in mixing the reactant gases. The reactants are first passed in the ratio of 1.4 moles of ketene to 1.0 mole of hydrogen cyanide through a horizontal preheat tube heated to a temperature of about 200° C. and then through the heated catalyst tube. The flow rate is so adjusted that the reactants remain in contact with the catalyst surface for from 0.07 to 0.32 second. The effluent gases pass from the catalyst chamber to a condenser. The resulting liquid condensate is fractionated to give 1-acetoxy-1,1-dicyano ethane (B. P. 110° C./18 mm.). In the following table there are recorded the reaction temperature, the conversion of hydrogen cyanide to 1-acetoxy-1,1-dicyano ethane and the yield of 1-acetoxy-1,1-dicyano ethane based on the hydrogen cyanide charged less the hydrogen cyanide present in the effluent gases. In each case the results tabulated are the average of a number of one hour runs utilizing the same catalyst.

| Catalyst [1] | Temperature | Per Cent Conversion | Per Cent Yield |
| --- | --- | --- | --- |
| #1 | °C. 390 | 34 | 76 |
| #2 | 390 | 34 | 74 |
| #3 | 390 | 25 | 93 |
| #4 | 300 | 27 | 74 |
| #4 | 340 | 23 | 68 |
| #4 | 390 | 26 | 70 |

[1] Each of catalysts #1, #2, #3, and #4 is a different type of unactivated hardwood or softwood "chicken" charcoal. Because of the widely varying sources of such charcoals, it is not possible accurately to identify the particular wood from which the charcoals are obtained.

When the above examples are repeated using other of the various forms of unactivated carbon, the conversions and yields obtained are in general equivalent to those in the above examples. Also, when the reactant gases are passed over the catalyst at different molar ratios or at other temperatures in the range of 200° C. to 550° C., excellent results are obtained. However, when pumice is used at the catalyst under such conditions monomolecular acetyl cyanide, rather than 1-acetoxy-1,1-dicyano ethane, is the product formed.

Besides being useful in preparing monomeric vinylidene cyanide, the 1-acetoxy-1,1-dicyano ethane prepared according to the method of this invention is also useful for other purposes. For example, it possesses insecticidal, fungicidal and herbicidal properties as well as being a valuable intermediate in other chemical synthesis.

Although specific examples of the invention have been herein described, it is not intended to limit the invention solely thereto, but to include all of the variations and modifications falling within the spirit and scope of the appended claims.

I claim:

1. The method which comprises passing reactants consisting of ketene and hydrogen cyanide in the vapor phase over a catalyst comprising an unactivated carbon at a temperature of from 200° C. to 550° C., whereupon chemical reaction occurs between the ketene and hydrogen cyanide to form 1-acetoxy-1,1-dicyano ethane.

2. The method which comprises passing reactants consisting of ketene and hydrogen cyanide in the vapor phase over a catalyst comprising an unactivated carbon at a temperature of from 350° C. to 400° C., whereupon chemical reaction occurs between the ketene and hydrogen cyanide to form 1-acetoxy-1,1-dicyano ethane, and separating said 1-acetoxy-1,1-dicyano ethane from the effluent vapors.

3. The method which comprises passing reactants consisting of ketene and hydrogen cyanide in the vapor phase over an unactivated charcoal catalyst at a temperature of from 200° C. to 550° C., whereupon chemical reaction occurs between the ketene and hydrogen cyanide to form 1-acetoxy-1,1-dicyano ethane, and separating said 1-acetoxy-1,1-dicyano ethane from the effluent vapors.

4. The method which comprises passing reactants consisting of ketene and hydrogen cyanide in the vapor phase over an unactivated charcoal catalyst at a temperature of from 350° C. to 400° C., whereupon chemical reaction occurs between the ketene and hydrogen cyanide to form 1-acetoxy-1,1-dicyano ethane, condensing the effluent vapors, and separating said 1-acetoxy-1,1-dicyano ethane from the resulting liquid condensate.

5. The method which comprises passing reactants consisting of ketene and hydrogen cyanide in the ratio of from 1.2 to 2.0 moles of ketene to 1.0 mole of hydrogen cyanide, in the vapor phase over an unactivated charcoal catalyst at a temperature of from 350° C. to 400° C., whereupon chemical reaction occurs between the ketene and hydrogen cyanide to form 1-acetoxy-1,1-dicyano ethane, and distilling the resulting liquid condensate to obtain said 1-acetoxy-1,1-dicyano-ethane.

ALAN E. ARDIS.

REFERENCES CITED

The following references are of record in the file of this patent:

UNITED STATES PATENTS

| Number | Name | Date |
| --- | --- | --- |
| 2,383,137 | Lecher et al. | Aug. 21, 1945 |
| 2,395,930 | Johnston et al. | Mar. 5, 1946 |
| 2,396,201 | Ray | Mar. 5, 1946 |
| 2,426,014 | Gresham | Aug. 19, 1947 |

OTHER REFERENCES

Nef: Liebig's Annalen, vol. 287, p. 348 (1895).